July 28, 1936.  R. M. OTIS  2,049,078
FLUID TRANSMISSION
Filed July 9, 1934  2 Sheets-Sheet 1

INVENTOR:
Russell M. Otis

July 28, 1936.  R. M. OTIS  2,049,078

FLUID TRANSMISSION

Filed July 9, 1934  2 Sheets-Sheet 2

INVENTOR:
Russell M. Otis

Patented July 28, 1936

2,049,078

UNITED STATES PATENT OFFICE 2,049,078

FLUID TRANSMISSION

Russell M. Otis, Pasadena, Calif., assignor to Burt-Warner Power Corporation, Pasadena, Calif.

Application July 9, 1934, Serial No. 734,329

5 Claims. (Cl. 60—62)

My invention relates to fluid transmissions and particularly to closed circuit fluid transmission systems in which provision is made for braking of the driven member and in which a make-up means is provided to inject new fluid into the system to compensate for leakage.

An object of my invention is to make possible braking by the driving motor with consequent exhaustion of the main capacity of the low pressure side of the system without making it necessary for the make-up device to operate to inject new fluid into the system during this temporary depletion. Another object is to provide an arrangement of ports whereby the make-up device will come into use when there is a legitimate need for more fluid to be injected into the system. Other objects will appear from the disclosures in the specifications and drawings.

Figure 1:
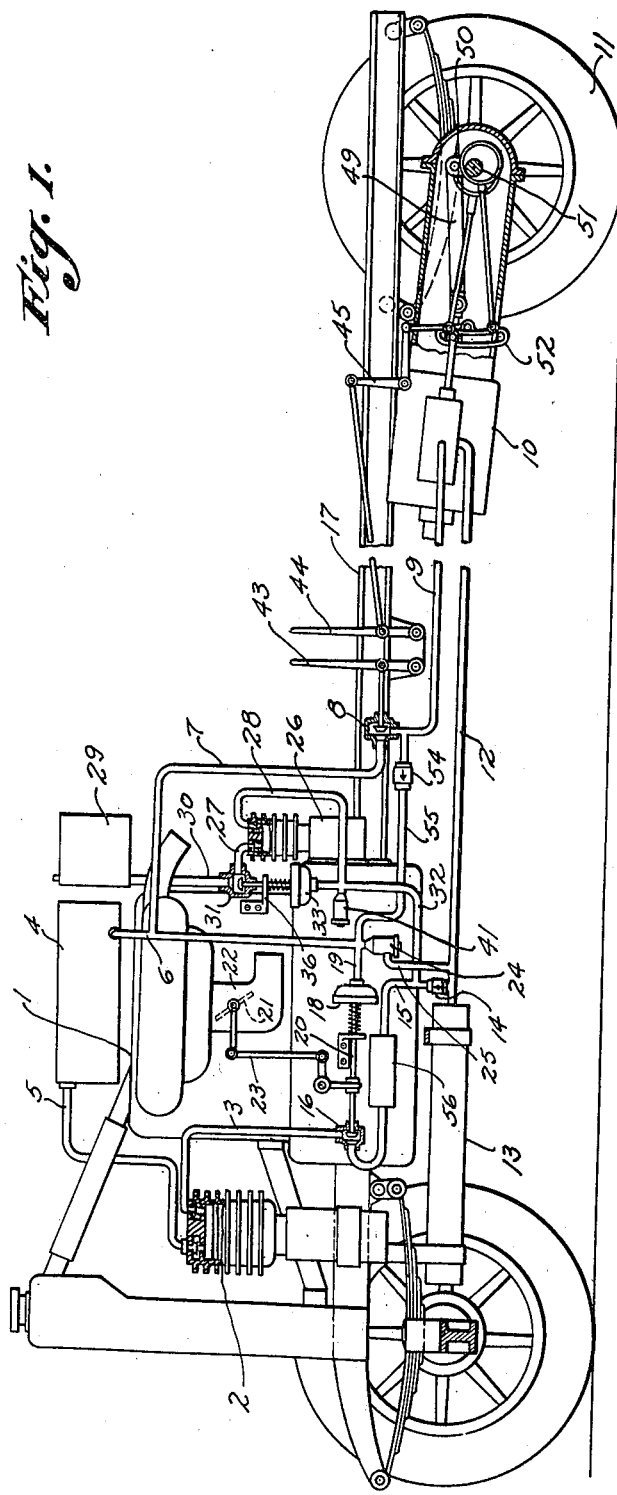
Fig. 1 is a drawing showing the fluid transmission as applied in an automobile.
Figure 3:
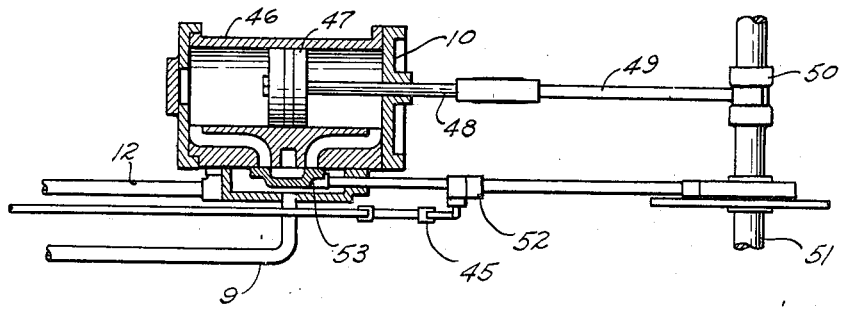
Fig. 3 is a detail of the fluid motor.

In the application to an automobile, illustrated in Fig. 1, an internal combustion engine 1 mounted on frame 17 drives compressor 2 also mounted on frame 17 which draws fluid through intake pipe 3 and its associated compressor check valve and compresses it into high pressure reservoir 4 through pipe 5 and its associated compressor check valve. The high pressure fluid passes through pipes 6 and 7, throttle 8, and pipe 9 to the valve-controlled fluid motor 10, which drives the wheels 11. The fluid is exhausted from the motor 10 through pipe 12, to low pressure reservoir 13. When the compressor is compressing, it takes air out of pipe 12 through check valve 14, pipe 15, unloader valve 16 and pipe 3.

The path of the fluid is thus seen to be through a closed circuit to which are connected on both the high and the low pressure sides reservoirs which serve to prevent any sudden changes in pressure. The engine supplies the power to the compressor which is used to pump fluid, usually air, into the high pressure reservoir where the used energy is stored as potential energy of the fluid. This energy is available for driving the fluid motor which again transforms it into mechanical energy at the wheels. The closed circuit in a fluid transmission is particularly advantageous because of the huge outputs of power that can be transmitted with relatively small equipment, especially when the ratio of the pressures on the high and low pressure sides of the system is made about 3. Another advantage resides in the fact that, since the compression ratio is small, the temperature of the discharged air from the compressor is also low, and for the same reason, there is no freezing at the exhaust of the fluid motor.

For best efficiency it is desirable to maintain the fluid pressure in the high pressure side of the system substantially constant. To this end the speed of the internal combustion engine is varied to correspond to the demand for fluid and when the speed is reduced to a little above the stalling speed the compressor is unloaded. Fluid pressure reaches diaphragm pressure regulator 18 by way of pipes 6 and 19 from high pressure reservoir 4. The regulator 18 causes rod 20 to move in a direction to gradually close throttle 21 of carburetor 22 through linkwork 23 when the pressure in reservoir 4 increases. The effect of this is to decrease the speed of the engine and compressor and decrease the amount of fluid pumped into the reservoir as pressure increases. When a pressure is reached at which a speed near to stalling occurs, the rod 20 is advanced to a point where the valve 16 is closed, shutting off the intake supply to the compressor 2 which normally would be through pipe 3, valve 16, pipe 15, check valve 14, and pipe 12 from reservoir 13. After the intake is shut off, the compressor does no work and the engine idles. This condition persists until the pressure in reservoir 4 drops sufficiently to permit the valve 16 and the throttle 21 to open whereupon pumping again starts. If, for any reason, the pressure regulation fails and the pressure exceeds the safe limit, it is discharged from the high pressure reservoir 4 through pipe 6, the safety relief valve 24, pipe 25, and pipe 12 into the low pressure reservoir 13.

Figure 2:
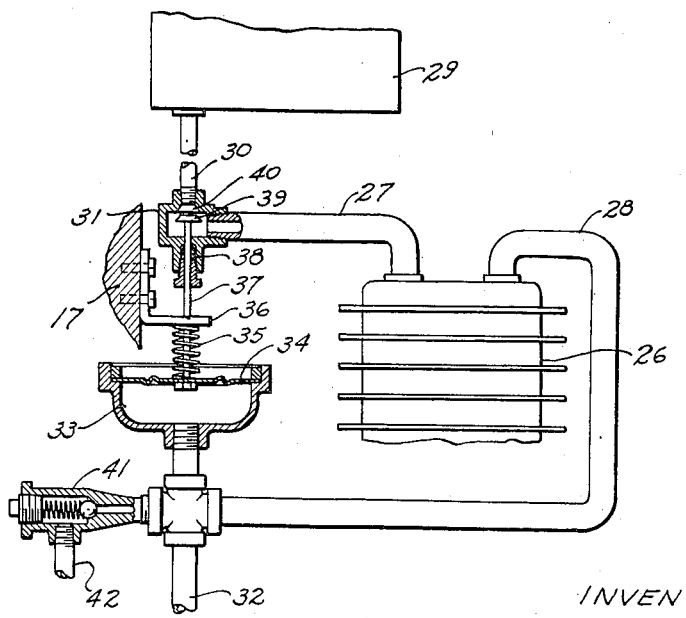
Fig. 2 is a detail of the fluid make-up apparatus.

In order to make up for leaks of fluid from the system into the atmosphere, an automatic make-up means is provided. This can be seen in detail by referring to Fig. 2. A compressor 26 is mounted on the frame 17 and has a shaft which is coupled to the shaft of engine 1 so that the compressor runs whenever the engine runs. 27 is the pressor pipe and 28 is the discharge pipe. In the intake pipe and 28 is the discharge pipe. In the particular embodiment illustrated, air is employed as the working fluid, so in the operation of the make-up means, when more air is demanded by the system, air is taken into the compressor 26 through cleaner 29, pipe 30, valve 31, pipe 27 and its associated compressor check valve and discharged through pipe 28 and its associated compressor check valve and pipe 32 into pipe 15 where it can be taken in by compressor 2 and pumped up into the high pressure side of the system. The air cannot, however, pass from pipe 15 back into the low pressure reservoir 13 because of the check valve 14 which permits fluid to pass only in a direction away from pipe 12.

The operation of the make-up system is automatically controlled. When the pressure in pipe 15 exceeds a predetermined value, it acts through pipe 32 on diaphragm regulator 33 to close valve 31 which shuts off the intake to the compressor 26, unloading it and causing it to stop discharging air into pipe 15. In the operation of the regulator 33, pressure acts on diaphragm 34 against the compression of spring 35, the reaction of which is taken by the bracket 36 mounted on the frame 17, to move the rod 37 through packing 38 in a direction to bring the valve cone 39 against the valve seat 40. Should the pressure regulator 33 not function properly and the pressure in pipes 15, 32, and 28 rise to a dangerously high value, the safety valve 41 opens and passes fluid out through pipe 42 to the atmosphere.

The control of the motion of the car is through two levers: lever 43 which controls throttle 8 in the high pressure line to the fluid motor 10, and lever 44 which, through linkwork 45, controls the valves of motor 10. The fluid motor 10 is like an ordinary steam engine having cylinder 46, piston 47 on piston rod 48, driving crank 50 through connecting rod 49. Crank 50 is on axle 51 attached to wheels 11. The valve mechanism 52 controls the time of cut-off, admission and exhaust and, in addition to being reversible, is capable of variation over a wide range of cut-off. The valve events are, of course, determined by the phase relation of valve 53 with respect to piston 47, which relation is changed by manipulation of the mechanism 52 through movement of the lever 44. A standard Stephenson link has been shown and since this valve gear is so old and so well known to those skilled in the art, it is not considered necessary to explain its operation in detail.

In the normal operation of the car in the forward direction, fluid pressures in the high and low pressure reservoirs stay substantially constant. The throttle 8 is wide open; the valves of the fluid motor are set in the forward position with the desired cut-off; the fluid passes from the high pressure side of the system through the fluid motor to the low pressure side from which it is compressed into the high pressure side again by compressor 2. The compressor speed varies and the compression starts and stops in response to the pressure in the reservoir 4. The compressor 26 compresses and idles at intervals depending upon the need for make-up fluid as shown by the pressure in pipe 15.

One of the most important advantages of the type of transmission here described is that it can be employed as a brake for the vehicle which it drives. This is accomplished by setting the valves of the motor in reverse which makes a compressor of the motor. Under these circumstances fluid is taken from low pressure reservoir 13 through pipe 12 into the motor 10 and is compressed and sent out through pipe 9. The energy required for the compression is supplied by the car in coming to rest. If the throttle 8 were left open during the braking operation, the car would immediately start backwards upon coming to rest, since the valves would be in reverse. Hence it is necessary to close the throttle 8. But it is also necessary during braking to provide a path from pipe 9 into the high pressure reservoir 4 and this path must not be conducting in the other direction. A check valve 54 in pipe 55 is, therefore, made to shunt the throttle 8. This check valve permits fluid to be pumped by motor 10 into the tank 4; but when the car has stopped, the fluid cannot return to the motor to propel the car in the reverse direction.

During braking, fluid is taken from the low pressure reservoir 13 and is pumped into the high pressure tank by motor 10. To prevent the lowering pressure in the tank 13 from causing the make-up apparatus to start working, the check valve 14 is placed in the pipe 15 between the low pressure reservoir and the pipe 32 leading to the make-up regulator 33 and the inlet to the compressor 2. This check valve 14 permits fluid to pass in the direction of the indicating arrow from the tank 13 and the pipe 12 into the pipe 15 and thence into the compressor intake and into the make-up regulator; so when the car is being driven by the transmission the fluid can circulate freely and if there is a real demand for more air in the system as evidenced by lowered pressure in the tank 13 it will quickly become apparent in pipe 15 when the compressor 2 starts working. When, however, the pressure in tank 13 is lowered not by leakage of fluid to the atmosphere but by having fluid pumped out of it in the braking process, the pressure in pipe 15 remains the same and, hence, there is no tendency for the make-up regulator to cause new air to be pumped into the system.

It is sometimes desirable to enlarge pipe 15 into a larger chamber as at 56 in order to make somewhat more constant the pressure in the pipe 15. Of course, chamber 56 may be simply a section of tank 13 with check valve 14 between the two sections.

What I claim as new and desire to secure by Letters Patent is:

1. In a closed pressure fluid transmission circuit including a compressor, a high pressure reservoir connected to the exhaust of said compressor, a reversible-valve fluid motor having an intake adapted to be connected to said high pressure reservoir, a low pressure reservoir connected to the exhaust of said fluid motor and adapted to be connected to the intake of said compressor, the combination of means automatically injecting fluid into the low pressure side of the circuit when the pressure in the intake pipe of said compressor is lower than a predetermined value, and valve means located in said circuit between said low pressure reservoir and the intake pipe of said compressor and adapted to prevent a lowered pressure in the low pressure reservoir from being communicated to the compressor intake pipe to start the automatic injecting means.

2. In a closed pressure fluid transmission circuit including a compressor, a high pressure reservoir connected to the exhaust of said compressor, a reversible-valve fluid motor having an intake adapted to be connected to said high pressure reservoir, a low pressure reservoir connected to the exhaust of said fluid motor and adapted to be connected to the intake of said compressor, the combination of means automatically injecting fluid into the low pressure side of the circuit in response to a pressure in the intake pipe of said compressor lower than a predetermined value, and a check valve in the compressor intake pipe between the low pressure reservoir and the point to the pressure of which the automatic injecting means is responsive, said check valve permitting fluid to flow only in a direction from said low pressure reservoir toward said point.

3. In a closed pressure fluid transmission circuit including a compressor, a high pressure reservoir connected to the exhaust of said compressor, a reversible-valve fluid motor having an intake adapted to be connected to said high pressure reservoir, a low pressure reservoir connected to the exhaust of said fluid motor and adapted to be connected to the intake of said compressor, the combination of means automatically injecting fluid into the intake pipe of said compressor in response to a pressure in the intake pipe of said compressor lower than a predetermined value, and a check valve in the compressor intake pipe between the low pressure reservoir and the point to the pressure of which the automatic injecting means is responsive, said check valve permitting fluid to flow only in a direction from said low pressure reservoir toward said point.

4. In a closed pressure fluid transmission circuit including a compressor, a high pressure reservoir connected to the exhaust of said compressor, a reversible-valve fluid motor having an intake adapted to be connected to said high pressure reservoir, a low pressure reservoir connected to the exhaust of said fluid motor and adapted to be connected to the intake of said compressor, the combination of a chamber in the intake pipe to said compressor, means automatically injecting fluid into said chamber in response to a pressure in said chamber lower than a predetermined value, and a check valve in said circuit between said low pressure reservoir and said chamber permitting fluid to pass from said low pressure reservoir into said chamber but not to pass in the reverse direction.

5. In a closed pressure fluid transmission circuit including a compressor, a high pressure reservoir connected to the exhaust of said compressor, a reversible-valve fluid motor having an intake adapted to be connected to said high pressure reservoir, a low pressure reservoir connected to the exhaust of said fluid motor and adapted to be connected to the intake of said compressor, the combination of means automatically injecting fluid into the low pressure side of the circuit in response to a pressure in the compressor intake pipe lower than a predetermined value, and valve means located in said circuit between said low pressure reservoir and the intake pipe of said compressor and adapted to prevent the automatic injecting means from operating when fluid is exhausted from the low pressure reservoir by way of the fluid motor.

RUSSELL M. OTIS.